US012312251B2

(12) United States Patent
Gozashti et al.

(10) Patent No.: US 12,312,251 B2
(45) Date of Patent: May 27, 2025

(54) METHOD AND PACKAGED SYSTEM FOR FILTERING WATER

(71) Applicant: ReAqua Solutions, LLC, Midland, TX (US)

(72) Inventors: Farid Gozashti, Abilene, TX (US); Erik Gregersen, Midland, TX (US); Brett Gill, Houston, TX (US); Roger Krumrey, Porter, TX (US)

(73) Assignee: ReAqua Solutions, LLC, Midland, TX (US)

( * ) Notice: Subject to any disclaimer, the term of this patent is extended or adjusted under 35 U.S.C. 154(b) by 0 days.

(21) Appl. No.: 18/196,376

(22) Filed: May 11, 2023

(65) Prior Publication Data

US 2023/0365429 A1   Nov. 16, 2023

Related U.S. Application Data

(60) Provisional application No. 63/340,562, filed on May 11, 2022.

(51) Int. Cl.
*C02F 1/00*      (2023.01)
*B01D 24/46*    (2006.01)
(Continued)

(52) U.S. Cl.
CPC .......... *C02F 1/004* (2013.01); *B01D 24/4631* (2013.01); *B01J 20/34* (2013.01); *C02F 1/28* (2013.01); *C02F 1/72* (2013.01); *C02F 9/20* (2023.01); *B01D 24/007* (2013.01); *B01D 24/48* (2013.01); *B01J 20/02* (2013.01);
(Continued)

(58) Field of Classification Search
None
See application file for complete search history.

(56) References Cited

U.S. PATENT DOCUMENTS

| 6,426,005 | B1  |   | 7/2002 | Larsson |            |
|-----------|-----|---|--------|---------|------------|
| 8,486,275 | B2  | * | 7/2013 | Wolf    | C02F 9/00  |
|           |     |   |        |         | 210/741    |
| 8,795,521 | B1  | * | 8/2014 | McBride | B01D 24/4631 |
|           |     |   |        |         | 210/189    |

(Continued)

FOREIGN PATENT DOCUMENTS

| WO | WO-2019195543 A1 * | 10/2019 |
| WO | 2020165594 A1 | 8/2020 |

OTHER PUBLICATIONS

PCT International Search Report and Written Opinion dated Jul. 27, 2023, PCT International Application No. PCT/US23/21948, pp. 1-10.

*Primary Examiner* — Clare M Perrin
(74) *Attorney, Agent, or Firm* — Outlier Patent Attorneys, PLLC (57) ABSTRACT

A system for reconditioning contaminated water includes a plurality of filter tanks, each filter tank configured to hold a media mixture comprising media particles to which contaminants adhere when the contaminated water is pumped through the filter tanks and a feed water pump to pump the contaminated water through the plurality of filter tanks. The plurality of filter tanks are configured to form a multistage filter system for filtering the contaminated water at different contaminant particle sizes, and the feed water pump pumps the contaminated water through the multistage filter system in a continuous manner during a normal filtering mode.

18 Claims, 11 Drawing Sheets

(51) Int. Cl.
  *B01J 20/34* (2006.01)
  *C02F 1/28* (2023.01)
  *C02F 1/72* (2023.01)
  *C02F 9/20* (2023.01)
  *B01D 24/00* (2006.01)
  *B01D 24/48* (2006.01)
  *B01J 20/02* (2006.01)
  *B01J 20/10* (2006.01)
  *C02F 103/10* (2006.01)

(52) U.S. Cl.
  CPC ........... *B01J 20/10* (2013.01); *C02F 2103/10* (2013.01); *C02F 2201/008* (2013.01); *C02F 2203/008* (2013.01); *C02F 2209/001* (2013.01); *C02F 2209/03* (2013.01); *C02F 2209/04* (2013.01); *C02F 2303/16* (2013.01)

(56) References Cited

U.S. PATENT DOCUMENTS

| | | | |
|---|---|---|---|
| 2008/0314807 A1* | 12/2008 | Junghanns | B01D 61/025 210/85 |
| 2011/0089123 A1* | 4/2011 | Kennedy | C02F 1/001 210/323.1 |
| 2014/0021137 A1* | 1/2014 | Smiddy | C02F 1/281 210/663 |
| 2015/0001161 A1* | 1/2015 | Wiemers | E21B 43/2607 210/201 |
| 2015/0034552 A1 | 2/2015 | Pickett et al. | |
| 2016/0023927 A1* | 1/2016 | Jacobs | C02F 1/722 210/759 |
| 2017/0166468 A1* | 6/2017 | Gorrell | C02F 1/444 |
| 2018/0021734 A1* | 1/2018 | Eder | B01D 15/361 210/636 |
| 2019/0300405 A1* | 10/2019 | Mante | C02F 1/78 |

* cited by examiner

| Valve | Normal Run Status | Seq 1 BW Status | Seq 2 BW Status | Seq 3 BW Status | Seq 4 BW Status | Drain Status | Off Status |
|---|---|---|---|---|---|---|---|
| XV-01 | Open | Closed | Open | Closed | Closed | Open | Closed |
| XV-02 | Open | Closed | Closed | Closed | Closed | Open | Closed |
| XV-03 | Closed | Open | Closed | Closed | Closed | Open | Closed |
| XV-04 | Closed | Open | Open | Closed | Closed | Open | Closed |
| XV-05 | Closed | Closed | Closed | Closed | Open | Open | Closed |
| XV-06 | Closed | Closed | Closed | Open | Closed | Closed | Closed |
| XV-07 | Open | Closed | Closed | Open | Closed | Open | Closed |
| XV-08 | Closed | Closed | Closed | Closed | Closed | Open | Closed |
| XV-09 | Closed | Closed | Closed | Closed | Open | Open | Closed |
| XV-10 | Closed | Closed | Closed | Closed | Closed | Open | Closed |

METHOD AND PACKAGED SYSTEM FOR FILTERING WATER

CROSS-REFERENCE TO RELATED APPLICATIONS

This application claims priority to U.S. Provisional Application No. 63/340,562, entitled "Method and Packaged System for Filtering Water," filed on May 11, 2022.

BACKGROUND

Field of the Art

This disclosure relates to filtering fluids. More specifically, in a preferred exemplary embodiment, a skid-mounted automated, multi-stage, multi-media filter package system removes contaminants and suspended solids in a continuous manner from a fluid stream in the oil and gas industry, such as produced water resultant just from extracting oil from a producing oil well or flowback fluids resultant from hydraulic fracturing operations.

Discussion of the State of the Art

Water is naturally produced out of an oil well and is referred to as "produced water". This produced water occurs naturally in oil wells as a byproduct of production from wells drilled in the earth's crust. For example, on average, there will be approximately ten barrels of water for every one barrel of oil produced out of an oil well. So, over a typical 30-year lifespan, even a single oil well produces a large amount of produced water that requires disposal or recycling.

Bulk production from such wells is frequently processed at the earth's surface and separated into individual components of oil, gas, and/or water. Historically, produced water has been treated as a waste product and reinjected into the earth's crust or otherwise disposed of in some manner.

The advent of wide-spread hydraulic fracturing operations also requires large volumes of water. The water produced after a frack, commonly known as flowback, recirculates back up through the wellbore to the Earth's surface and also requires treatment. Attempts have been made to recycle produced water for reuse in such fracking operations. However, produced water typically includes suspended solids and other contaminants that can negatively impact the performance of hydraulic fracturing operations. Therefore, such suspended solids and other impurities generally must be removed from produced water before it can be utilized as a hydraulic fracturing fluid.

One conventional method for treating and recycling produced water is the "floc and drop" approach wherein personnel introduce desired quantities of oxidants and other chemicals, typically flocculants, to the stored water and allow the oxidation process to react over a predetermined time period, typically at least several hours. A flocculant, such as alum, which is an expensive chemical, serves to destabilize contaminant particles by causing their aggregation into a floc. As the oxidants and other chemicals react with the water, some suspended solids fall to the bottom of the storage tank while other solids float to the top of water level, leaving an improved 'center' column of water volume that can be transferred to the next stage of the process, typically a mechanical filtration. Personnel are typically required to be present 24/7 to test the water and adjust the chemical levels depending on observed results, or variable inlet composition, and these systems typically have an effectiveness of 80-90%.

This conventional process requires a large area or footprint, complex chemical testing, multiple highly trained personnel, and large amounts of power.

In view of these and other drawbacks of the conventional methods for treating and recycling water in the oil and gas industry, the present inventors have recognized that it would be beneficial to address at least some of these drawbacks of conventional water treatment methods used in treatment of produced water and fracking flowback.

SUMMARY

The present invention provides an automated system that is mounted on a single packaged skid that can be readily transported, requires little or no personnel to operate, a small operational footprint, minimal rig-up time, a fraction of the chemicals, and fraction of the power, as well as the ability to treat fluids continuously while autonomously adjusting flowrates and oxidant injection to combat inlet variables without the need for a long retention times of some conventional methods and has an effectiveness of 99%.

The present invention thereby provides a fully automated, efficient, and cost-effective system that can be used to thoroughly clean fluids, potentially in various different applications. Relative to the oil and gas industry, the present invention has a twofold benefit in that it can handle both flowback from fracking as well as produced water from normal oil/gas extraction. Because the present invention does not use flocculants such as poly aluminum chloride or ferric chloride or other brand-named designer polymers used in conventional water recycling systems, its cleansing process does not require the extensive "fall out" settling time of conventional methods, which allows the process of the present invention to provide a continuous stream of reconditioned water. Thus, rather than a flocculation process involving a flocculent and its attendant "fall out" settling time, the present invention uses multiple stages in which an oxidant chemically interacts with water contaminants to cause the contaminants to adhere to one or more components of a media mix loaded in filter tanks, to thereby be removed from the input contaminated water.

Although there are various technologies out there that recycle such problematic water, by eliminating the "fall out" settling time of conventional methods, the present invention performs such water reconditioning continuously and, in the preferred exemplary embodiment, is a completely automated system that also eliminates labor conventionally used to monitor and make adjustments, thereby providing a water reconditioning process with much cheaper operating costs compared to other methods. In the preferred exemplary embodiment described herein, components have been sized so that the invention is implemented and packaged on a readily transportable skid and requires no ancillary equipment that needs to be plugged in around it, so the system is also highly mobile and has a small footprint.

Additionally, since the mixed media components will accumulate contaminants and will themselves need to be periodically cleaned, the invention also provides a backwash method to flush the contaminants off the media components in a fully automated manner requiring no involvement or monitoring from a human operator.

A fluid cleaning apparatus includes a multi-stage, multi-media filter packaged system that removes contaminants and suspended solids from a fluid stream. An oxidant is injected upstream of a main system pump. The apparatus also includes an on-board programmable logic control panel to automatically adjust certain variables. The variables may include operation, adjusting flowrate, adjusting chemical injection volume, and self-activating backwash. The fluid cleaning apparatus may be used to clean water that is used during hydraulic fracturing operations. The fluid cleaning apparatus may be mounted on a skid or trailer so that it is portable.

BRIEF DESCRIPTION OF THE DRAWING FIGURES

The accompanying drawings illustrate several embodiments and, together with the description, explain the principles of the invention according to the embodiments. It will be appreciated by one skilled in the art that the particular arrangements illustrated in the drawings are merely exemplary and are not to be considered as limiting of the scope of the invention or the claims herein in any way.

FIG. 1A illustrates a first side elevation view, FIG. 1B illustrates a second side elevation view opposite the first side.

DETAILED DESCRIPTION

In a preferred exemplary embodiment, the present invention provides an automated system that is located on a single packaged skid, requires few or no personnel to operate, a small operational footprint, minimal rig-up time, a fraction of the chemicals and power compared to the conventional methods, as well as the ability to treat fluids continuously without the need for a long retention time necessary for "fall out" settling of conventional systems. These benefits, including continuous, unmanned operation and reduced personnel and maintenance costs, mean that the present invention will provide recycled water for the oil and gas industry at a very small fraction of the cost of conventional methods.

Although the present invention is described herein as related to water treatment in the oil and gas industry, it is noted that concepts of this invention apply in other applications for water treatment, including without limitation, water treatment for the food and beverage industries and agriculture.

The invention is described by reference to various elements herein. It should be noted, however, that although the various elements of the inventive apparatus are described separately below, the elements need not necessarily be separate. The various embodiments may be interconnected and may be cut out of a singular block or mold. The variety of different ways of forming an inventive apparatus, in accordance with the disclosure herein, may be varied without departing from the scope of the invention.

Generally, one or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices and parts that are connected to each other need not be in continuous connection with each other, unless expressly specified otherwise. In addition, devices and parts that are connected with each other may be connected directly or indirectly through one or more connection means or intermediaries.

A description of an aspect with several components in connection with each other does not imply that all such components are required. To the contrary, a variety of optional components may be described to illustrate a wide variety of possible embodiments and in order to more fully illustrate one or more embodiments. Similarly, although process steps, method steps, or the like may be described in a sequential order, such processes and methods may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, or method is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Alternate implementations are included within the scope of various embodiments in which, for example, functions may be executed out of order from that shown or discussed, including substantially concurrently or in reverse order, depending on the functionality involved, as would be understood by those having ordinary skill in the art.

Overview

The exemplary embodiment of the present invention provides a fully automated, efficient, and cost-effective system that can be used to thoroughly clean fluids, potentially in many different industries or applications but is configured to be particularly useful in the oil and gas industry to treat produce water from normal oil/gas extraction as well as flowback water that results from fracking.

Apparatus

Figure 1A:
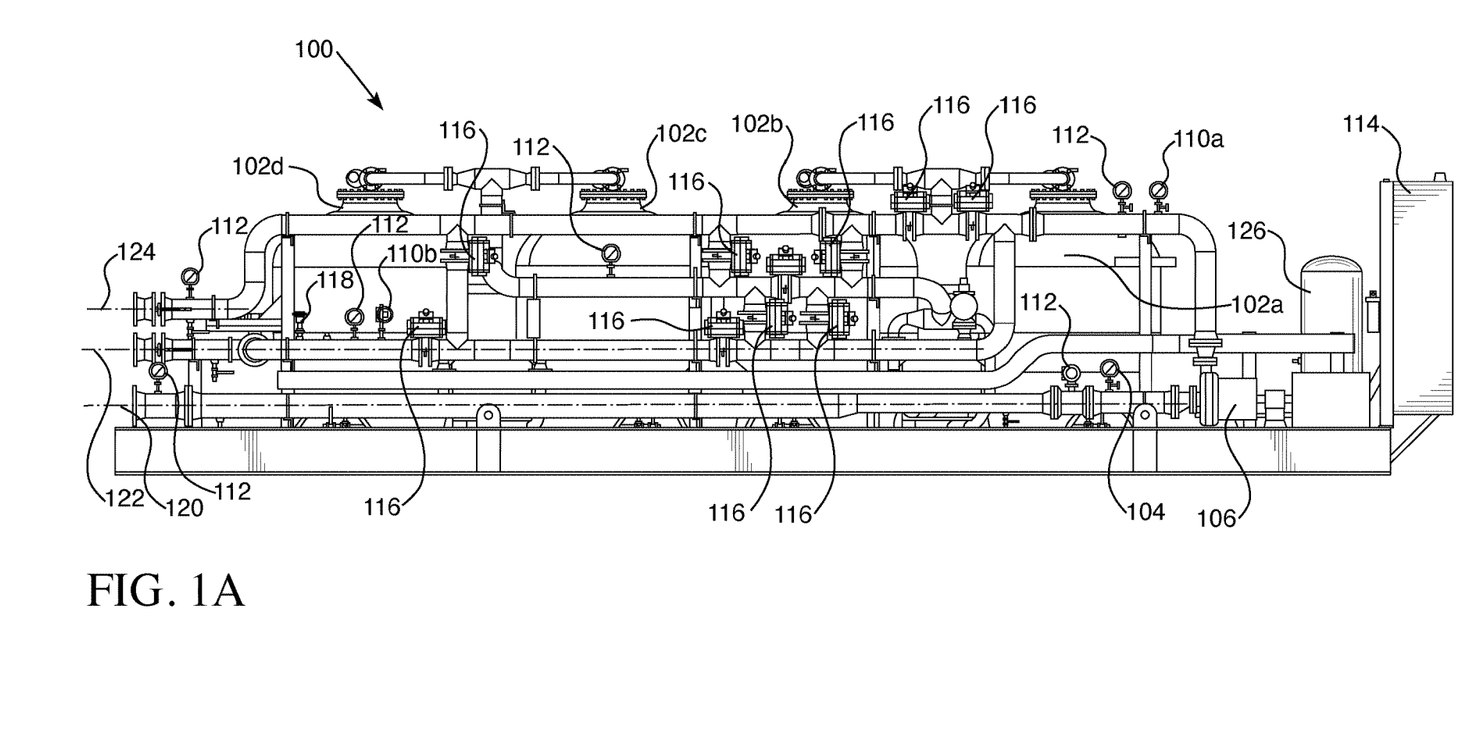
Figure 1B:
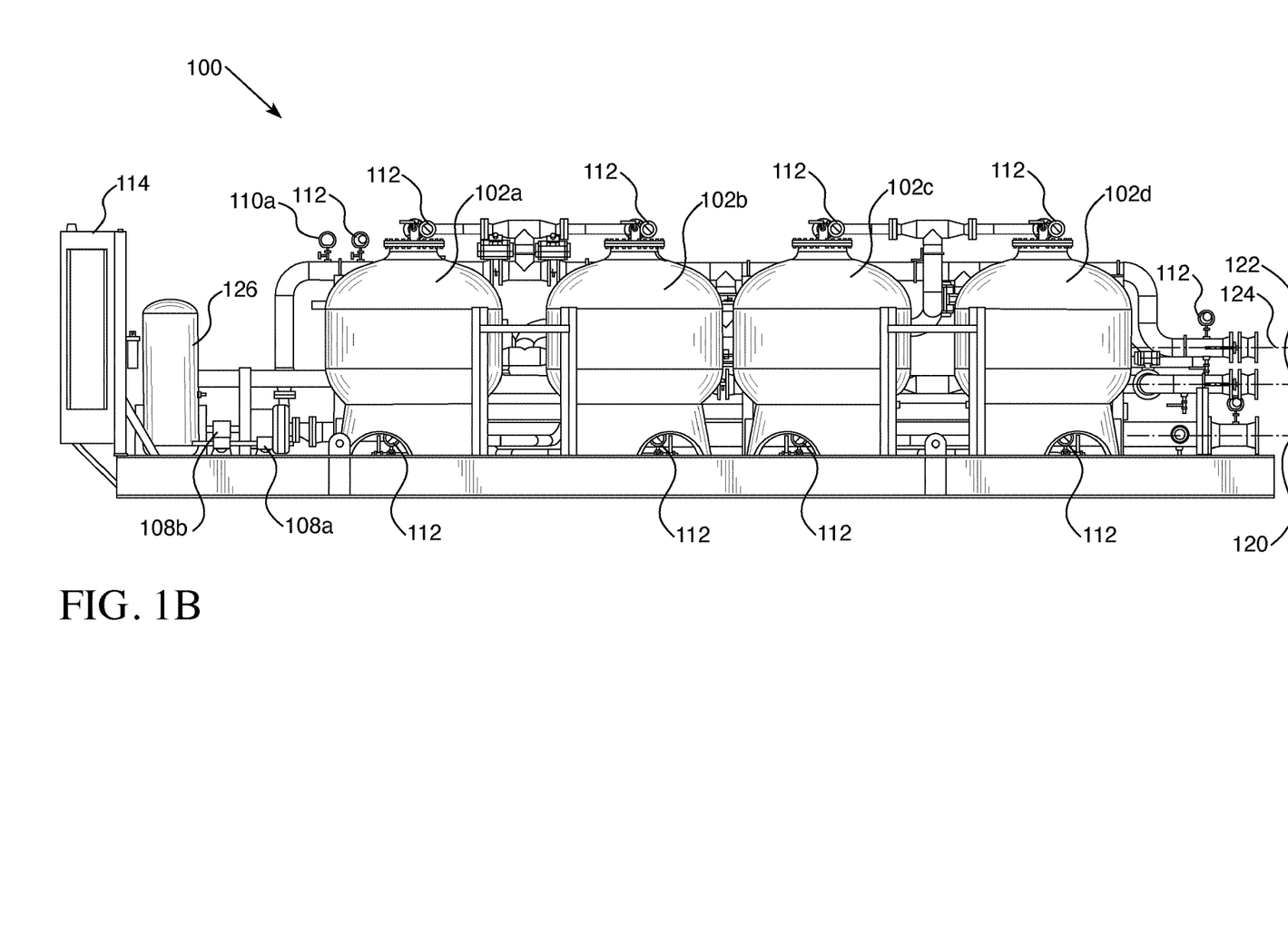
Figure 1C:
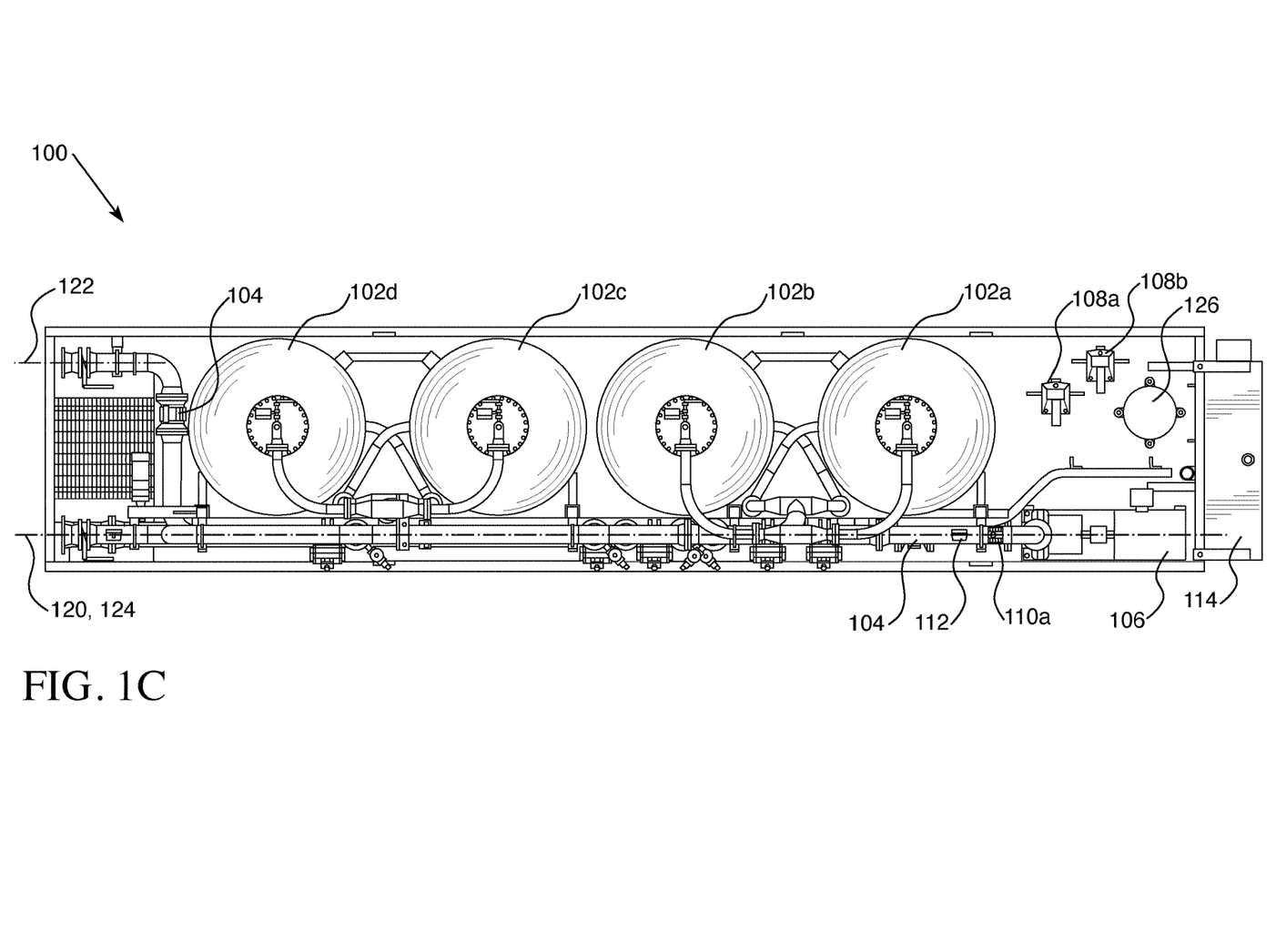
FIG. 1C illustrates a plan view of an exemplary skid-mounted preferred embodiment of the fluid cleaning apparatus of the present invention.

FIG. 1A and FIG. 1B depict side elevation views and FIG. 1C depicts a plan view of the fluid cleaning apparatus 100 of the present invention. These three figures together show a general arrangement of major equipment in a preferred exemplary embodiment in which the components are sized to be packaged on a single skid, sometimes referred to herein as "the Unit". Major components viewed in FIG. 1A-FIG. 1C include four filter tanks 102a, 102b. 102c, 102d, flowmeters 104, main pump 106, chemical pumps 108a. 108b, pressure transmitters 110, pressure indicators 112, unit control panel 114, control valves 116, and ORP sensor 118. All these components, as related to system control and functionality, are addressed in greater detail in later figures and the following discussion.

However, as an overview of overall operation, during the normal filtering mode the controller in the unit control panel 114 provides control signals to various valves to permit input contaminated water to be pumped via input pipe 120 continuously in sequence through the four filter tanks 102a, 102b. 102c, 102d while an oxidant is injected using chemical pump 108a at a rate necessary to address the current level of contamination, as detected by an Oxidation Reduction Potential (ORP) sensor 118 located at the water output stage. The ORP sensor 118 essentially detects how effective the reconditioning process has been in the four filter tanks 102a, 102b, 102c, 102d with the current ratio of oxidant being injected. Cleansed, filtered water exits via filtered water pipe 122.

Because the oxidant causes contaminants to collect on the media components loaded in the four filter tanks 102a, 102b. 102c, 102d, such contaminant buildup eventually tends to obstruct the flow of water, resulting in an increase in differential pressure as detected by pressure sensor 110a located at the input stage and pressure sensor 110b located at the output stage. Therefore, at a preset differential pressure, a backwash sequence is initiated during which the contaminants are flushed out of the media components in the filter tanks, with the backwash water exiting via pipe output pipe 124. Upon completion of the backwash process, the system 100 again automatically enters into the normal filtering mode.

In this normal filtering mode, each skid unit is designed to process 250 gallons per minute (GPM) so that approximately 8.571 barrels are processed per day, of which approximately 20% is reprocessed during the self-cleaning backwash feature.

An air compressor 126 is used to provide pressurized air to the various control valves 116 since these control valves 116 are pneumatic rather than electrical. These pneumatic control valves 116 control the water flow during the normal filtering mode and during the backwash mode. The electrical components of the skid, such as pumps, etc., use approximately 12.1 kw/hr at full running load, although there is an intermittent draw of 15.2 kw while the air compressor 126 is running which, for example, is typically only once per hour and for only around five minutes. The air compressor system periodically operates to maintain air pressure to operate the control valves 116 since these control valves 116 are pneumatic rather than electrically operated.

Figure 2:
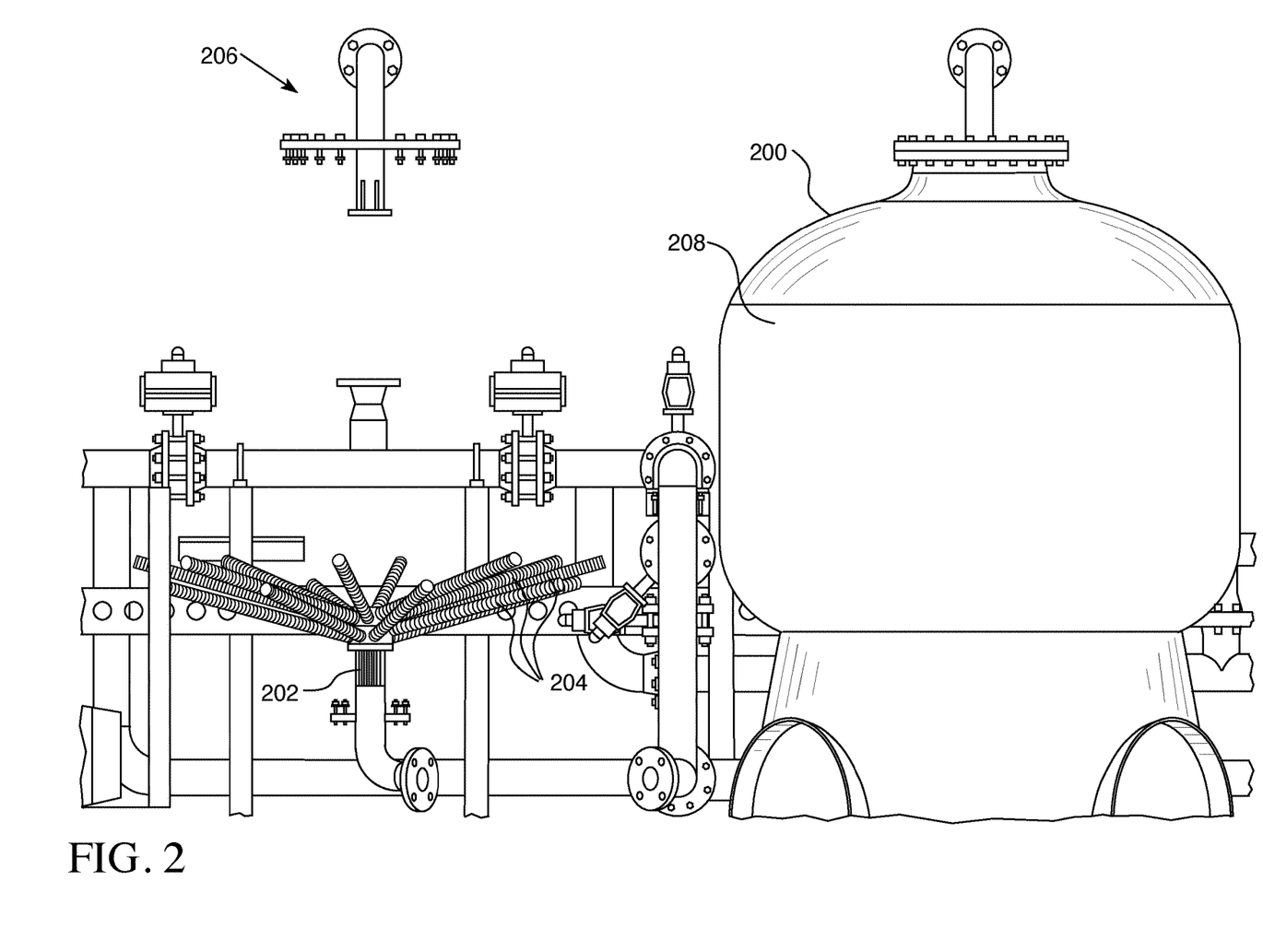
FIG. 2 illustrates a cross sectional view of a filter tank of the exemplary embodiment, including a lower hub and laterals and upper distributor (left side of figure) and how the filter tanks are filled with bulk media (right side of figure) that fills up approximately 80% of the interior volume of the tank.

FIG. 2 depicts a cross sectional view of a tank 200 (which is substantially similar to the tanks 102a, 102b, 102c, 102d of the system 100 depicted in FIGS. 1A-1C) of the fluid cleaning apparatus of the present invention. On the left side of FIG. 2, the tank is hidden for clarity and to show some of the internal components of the tank, including a lower hub 202 and laterals 204, and upper distributor 206. The right side of FIG. 2 shows how bulk media 208 occupies up to 80% of the internal space of the tank 200. To accommodate the system as packaged on a transportable skid, the tanks are approximately six feet in diameter. The lower hub 202 supports and uniformly distributes water (or other liquid) through the lower laterals 204 oriented at a specific angle from the hub 202. The location and geometry of the hub 202, laterals 204, tank internal wall and media, in unison, create an apparatus that operates efficiently at a set flow rate and operating pressure. This apparatus allows the system to operate at a set pressure which provides uniform and sufficient force to lift and suspend the media during backwash and holds the media in place during normal operation while preventing channeling. The upper distributor 206 is an inlet baffle during normal operation and evenly distributes flow across the top of the tank. During backwash, the baffle allows particulates to be discharged from the tank and to the waste stream piping system.

The use of laterals is common in some water recycling systems, so one of ordinary skill in the art would readily be able to design a lateral system including number of laterals and lengths, widths, and openings dimensions of such laterals. Laterals typically used in water recycling systems are conventionally made of a plastic material such as poly vinyl chloride (PVC). However, such conventional plastic laterals would be too weak to support the heavy mixed media components used in the oil and gas water recycling system of the present invention, which is a reason that conventional water recycling systems used in oil/gas water recycling systems are not based on systems using a system of laterals to distribute water. Recognizing this shortcoming of plastic laterals, the laterals of the present invention are made of stainless steel, to be able to support the weight of the components of the media mixtures used as filter elements in the present invention.

Figure 3:
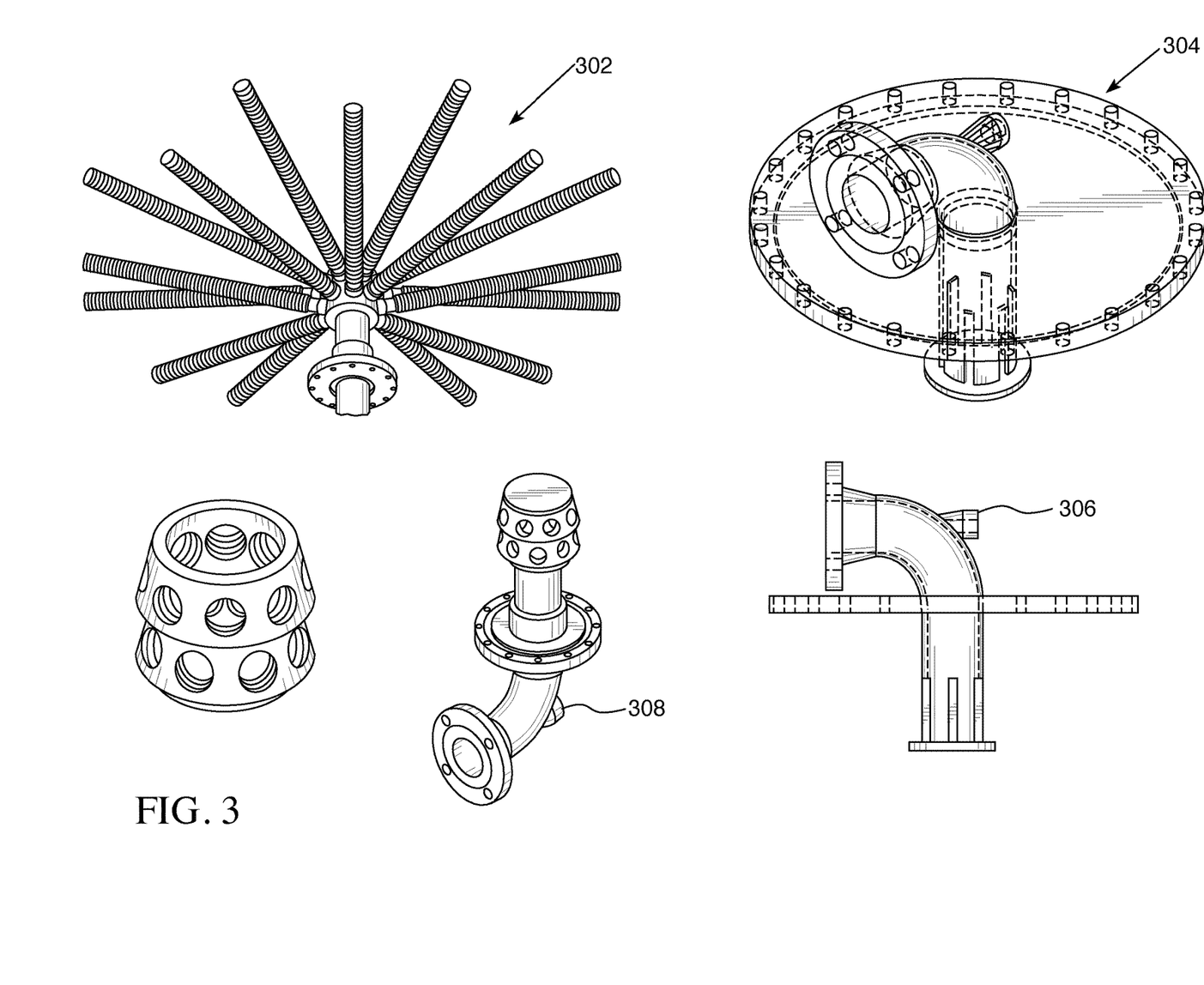
FIG. 3 illustrates additional details of the lower components and upper components shown in the left side of FIG. 2, as well as the drain and vent components of the filter tanks.

FIG. 3 depicts closer views of the internal lower 302 and upper distributors 304 and vent 306 and drain ports 308 of the fluid cleaning apparatus of the present invention. The vent 306 connection in the upper flange assembly is important during startup operations to purge air from the tanks 102a, 102b, 102c, 102d during the initial fill and used to vent the tanks 102a, 102b, 102c, 102d during draining operations. The drain 308 connection on the lower flange assembly allows complete draining of the tanks 102a, 102b, 102c, 102d after use prior to relocation to a new site or facility. The upper and lower flange assemblies are designed, manufactured, and machined to remove potential leak points typically found in water treatment systems.

Figure 4:
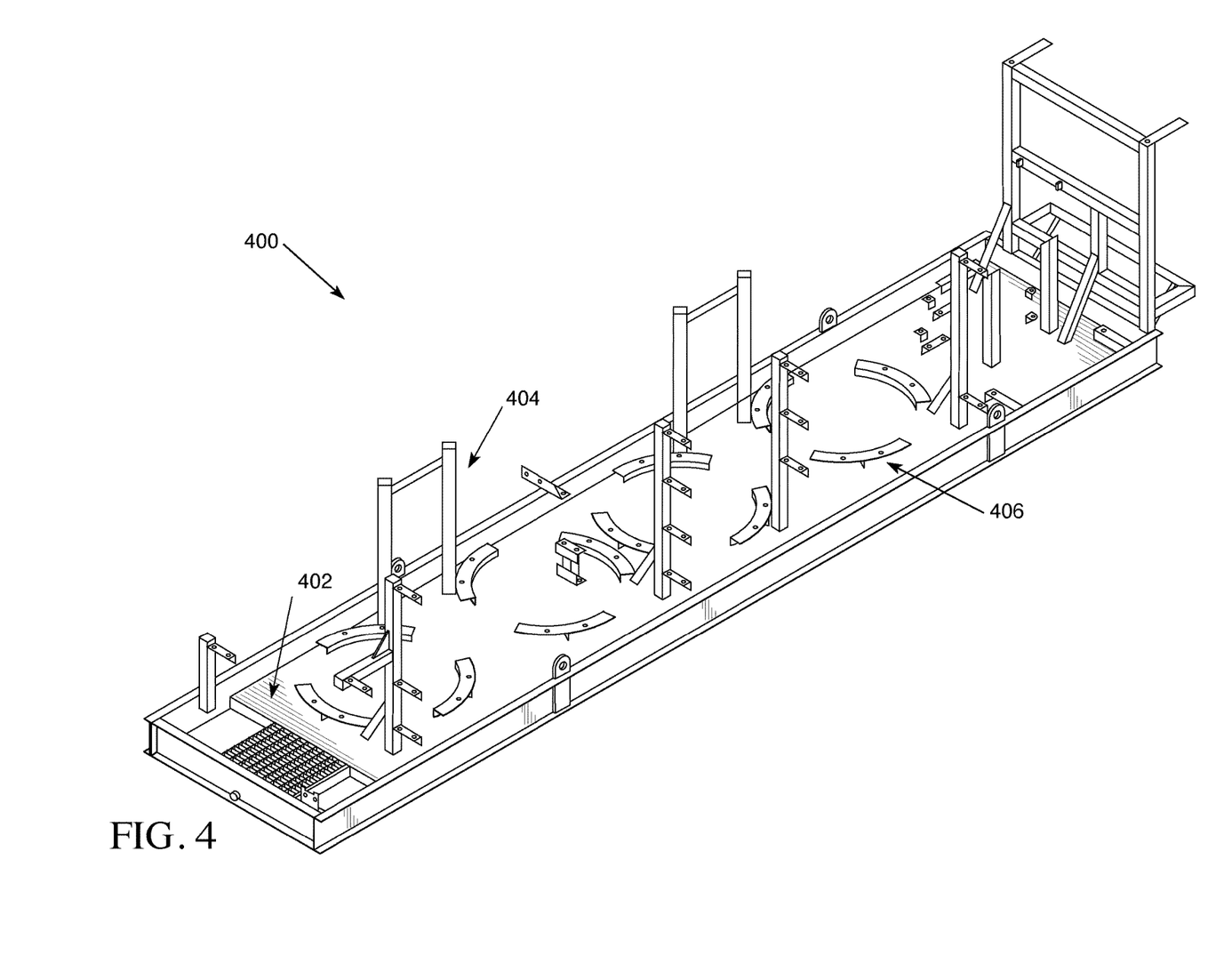
FIG. 4 illustrates an overhead perspective view of a skid layout of the fluid cleaning apparatus of the present invention.

FIG. 4 depicts an overhead perspective view of a skid layout 400, tank support structure, and containment pan of the fluid cleaning apparatus of the present invention. The skid containment drip pan 402 prevents water and/or other material from spilling on the ground and removes the requirement for elaborate containment around the apparatus. The containment pan 402 is recessed into the main skid beam runners to maximize containment volume and decrease the height of the center of gravity. The tank base 406 is attached to rolled angle iron providing a rigid structure to attach the tanks 102a, 102b, 102c, 102d, fastener accessibility, and eliminates through holes drilled through the containment pan that would allow leaks. A sump is located at the drain end of the skid where the skid drains into a site open drain system or is used to remove fluids using a vacuum pump/truck. Rigid steel posts 404 located aside the tanks provide a structure to fasten/strap the tanks 102a, 102b. 102c, 102d during shipment and prevent the tanks 102a, 102b, 102c, 102d from being dislodged.

Figure 5:
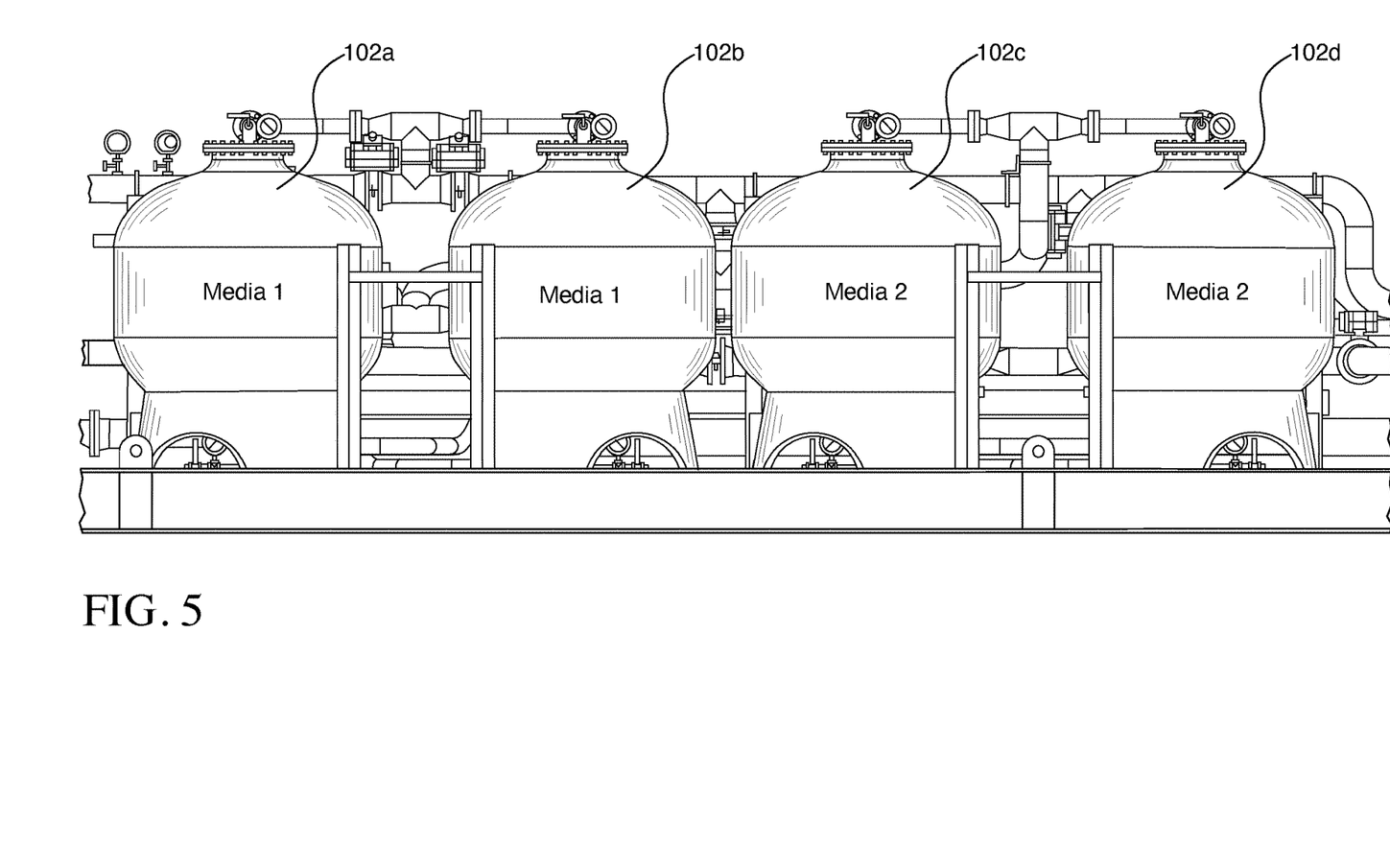
FIG. 5 illustrates a cross sectional view of the filter tanks that demonstrates stage 1 operation in two filter tanks, stage 2 operation in two filter tanks, and possible media blend configurations for the two stages.

FIG. 5 shows a cross sectional view of the filter tanks 102a, 102b, 102c, 102d, showing that filter tanks 102a and 102b provide stage 1 filtering while filter tanks 102c and 102d provide stage 2 filtering. The media is comprised of silica quartz, anthracite coal, and garnet that remove particulates of a specific size. The stage 1 filter(s) contain a combination of anthracite coal and silica quartz ("MEDIA 1") which remove larger micron particles. The stage 2 filter(s) contain multiple, independent layers of anthracite coal, silica quartz, and garnet ("MEDIA 2") which remove fine, smaller micron particles. These media components are common in the industry. However, these specific media compositions are exemplary only and not limiting to the practice or implementation of the invention since one of ordinary skill in the art would recognize that other media compositions would function in the structure and method of the present invention, although differences in parameters such as particle sizes, layering, etc. will affect the efficiency of the media mixtures as a filter for contaminant removal.

Figure 6:
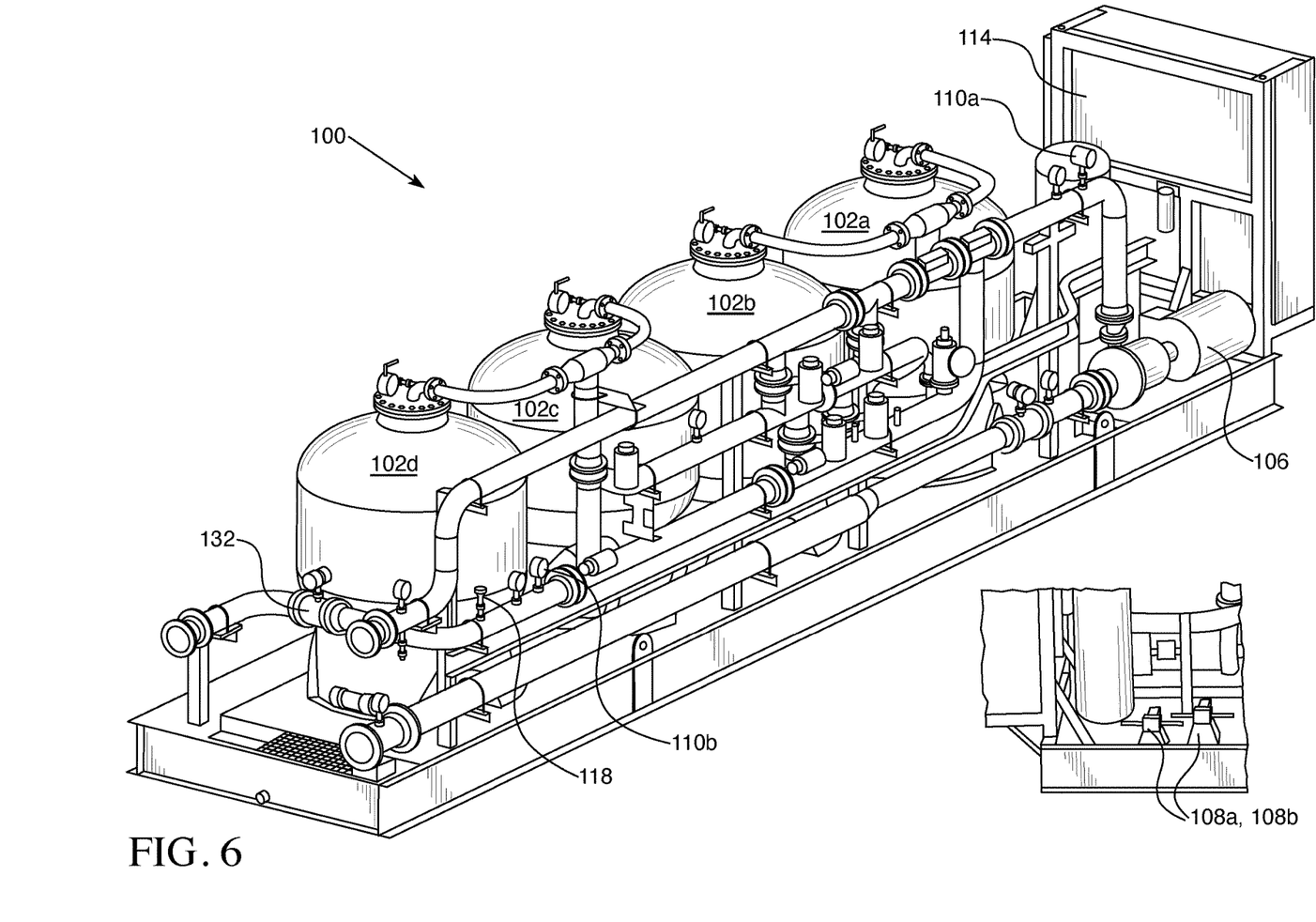
FIG. 6 illustrates electronic control devices (input and output flowmeters, input and output pressure transmitters, and ORP sensor) that communicate with the unit control panel of the fluid cleaning apparatus of the present invention, and the unit pump that pumps contaminated water/oxidant through the multistage filter during normal filtering mode and pumps reconditioned water/surfactant through the multistage filter during the backwash flushing mode, and chemical injection pumps for injecting an oxidant during normal mode and for injecting a surfactant during the backwash mode.

FIG. 6 depicts certain electronic control devices that communicate with a unit control panel 114 of the fluid cleaning apparatus 100 of the present invention. These electronic control mechanisms can instantaneously communicate with the apparatus control panel 114 enabling the apparatus to automatically adjust to preset process conditions. As a first automated feedback mechanism in the system, during normal operation the main pump 106 is operated from a variable frequency drive that controls the speed of motor/pump using a process integral derivative loop with the outlet flowmeter 132 to achieve a set flowrate target. As a second automated feedback system, the oxidation reduction potential ("OR P") sensor 118 reads the quality of the water at the outlet of the system and creates a process integral derivative loop with an adjustable speed control device for controlling the speed and relative flow rates of the chemical (oxidant) injection pumps 108a, 108b to achieve a preset ORP target that correlates with the contamination level of the incoming contaminated water.

Automated control of the system flowrate and the chemical injection rate eliminates the requirement for operations personnel present on location and reduces chemical 'waste' or overdosing by automatically injecting the correct amount of chemical in real time. Typical water treating and recycling operations require multiple operations personnel on location with distinct knowledge of water chemistry and sample testing. In the exemplary embodiment, the oxidant that is injected is 34% hydrogen peroxide, but this specific oxidant is exemplary only and not limiting to the invention since one of ordinary skill in the art would recognize that other oxidants would function in the structure and method of the present invention.

That is, although the 34% hydrogen peroxide is common and preferred in the oil and gas industry as an oxidant because it is relatively inexpensive and readily available, any oxidant such as, for example, chlorine, ozone gas, chlorine dioxide, bleach, etc., could be injected to achieve the same result as the common 34% hydrogen peroxide. The present invention therefore provides a "plug and play" feature with choice of oxidant to be injected, which could be a significant feature when the invention is applied in scenarios other than the oil and gas industry.

As a third automated feedback system, the inlet and outlet pressure transmitters 110a, 110b are multipurpose devices that allow control of system pressures, automated backwash function, and pressure limit shutdowns. The pressure transmitters 110a, 110b enable the calculation of the overall system differential pressure reading downstream of the pump 106 and at the outlet of the apparatus. During normal operation, the tanks 102a. 102b. 102c. 102d constantly accumulate solids that cause the system differential pressure to steadily increase eventually reaching a preset or predetermined differential pressure value of, for example, 30 PSI, which automatically activates the apparatus backwash function. The backwash function typically takes about 20 minutes and is fully automated and automatically returns the system to the normal filtering mode so there is no interruption in continuing to filter and recondition input contaminated water 24/7 without any operator presence. The control panel 114 is preset with pressure value parameters that provide alarms and shutdowns to alert personnel and prevent the apparatus from operating outside of design parameters, and such monitoring can be achieved remotely.

Figure 7:
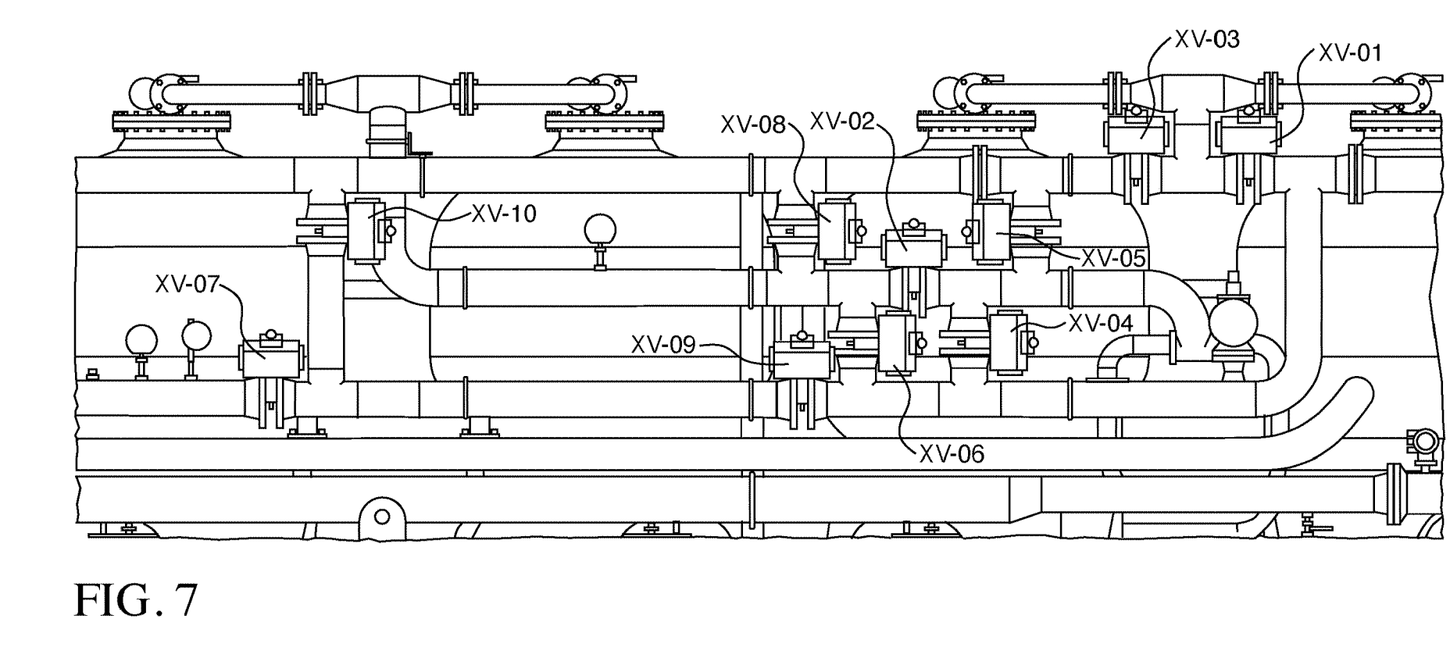
FIG. 7 illustrates an automated valve layout and tag numbers of the fluid cleaning apparatus of the present invention.

FIG. 7 depicts an automated valve layout and tag numbers of the fluid cleaning apparatus of the present invention. The automated valves control flow direction in the system during normal operation and four individual backwash/rinse functions. Once the predetermined differential pressure limit is reached, backwash sequence 1 initiates and the stage 1 filter(s) media is rinsed using an upwards flow of water to remove solids from the tank. The wastewater is discharged from the skid edge backwash outlet connection. Note that all four backwash/rinse functions exit the apparatus through the backwash outlet connection (pipe 124 in FIG. 1C). Backwash sequence 2 is a downward water flow that rinses the media in the stage 1 filter(s). Backwash sequence 3 is an upward flow of water that rinses the media in the stage 2 filter(s). Backwash sequence 4 is a downward flow of water that rinses the media in the stage 2 filter(s). Backwash sequence 4 completes the rinse process and the apparatus automatically returns to normal operation. During all backwash processes, the inlet flowmeter is used to adjust the flowrate using a process integral derivative loop to control pump speed.

Upon backwash sequence 1 initiation, the oxidant injection pump is turned off and the surfactant chemical injection pump is turned on. For example, sodium hydroxide may be used as the surfactant chemical. The backwash function efficiency is increased by stopping the oxidation process of the fine metals in the stream and yields a more complete and uniform rinse. The surfactant is a cleaning agent injected into the raw inlet water stream to enhance the removal of trace oils, grease, and/or hydrocarbons from the media. The oxidant injection pump is turned back on when sequence 4 backwash is within a specific time period prior to returning to normal operating mode.

Each sequence change (for example, from normal operation to backwash sequence 1) is controlled by limit switches in the control valves that communicate with the apparatus control panel that signal the valves to open and close within a specific time frame and chronological order. The control valves are actuated pneumatically via the skid mounted instrument air compressor. The valves in the current processing sequence (for example, normal operation) remain open while the valves in the following/next processing sequence (for example, backwash sequence 1) enter travel mode (the time in which the valves are actuating from closed to open) and reach the fully open position. When the backwash sequence 1 valves reach the fully open position, the limit switches signal the apparatus control panel to close the valves previously open during normal operation. The chronological order and timing of valve actuation during sequence change is critical to reducing the forces acting on the system preventing water hammer, pump deadhead, and premature failure of the control valves. The apparatus control panel is equipped with a valve mismatch function that signals an alarm and unit shutdown if a valve fails or does not actuate to the proper position for the given sequence.

Figure 8:
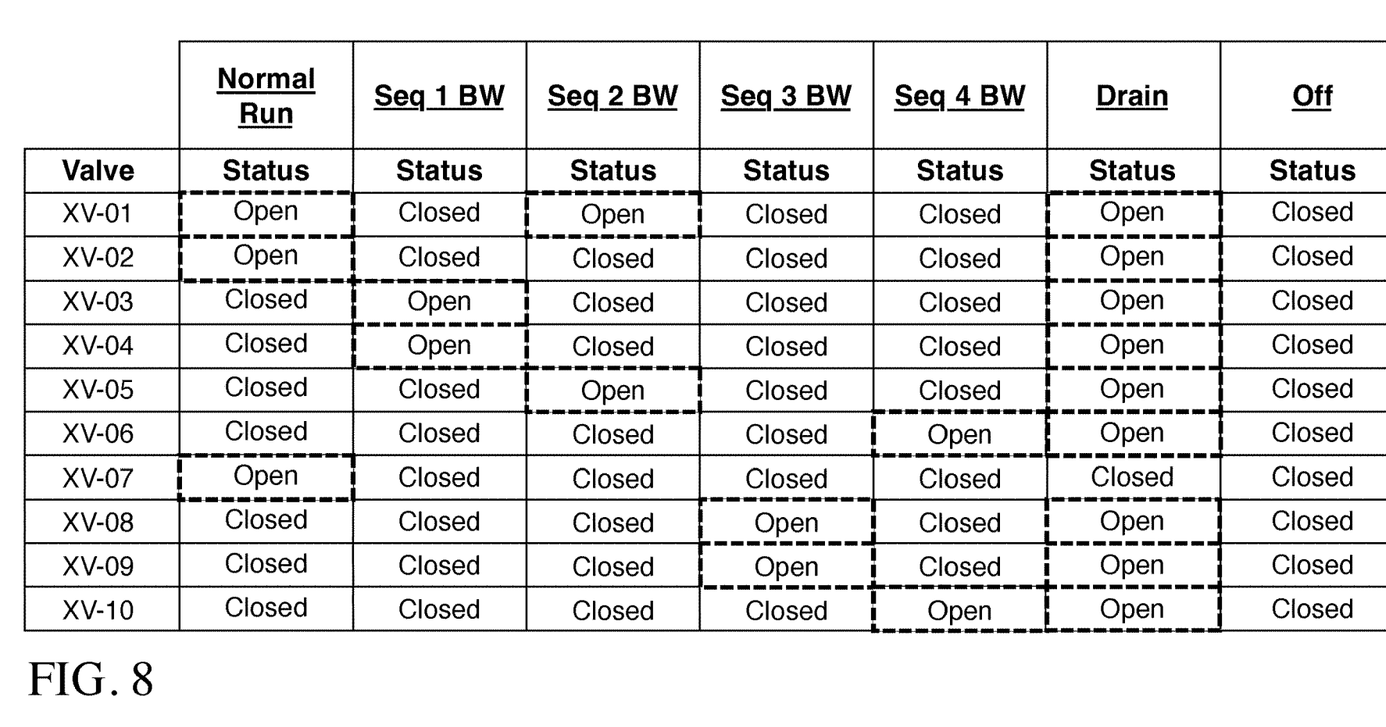
FIG. 8 illustrates a tabular view of automated valve sequences and relative position of valves for different operational modes of the fluid cleaning apparatus of the present invention.

FIG. 8 is a table of automated valve sequences and relative position of valves of the fluid cleaning apparatus of the present invention. FIG. 8 demonstrates how the unit controller 114 controls the valves XV-xx shown in FIG. 7 for the various operational modes, including both the normal filtering mode and the backwash mode.

Figure 9:
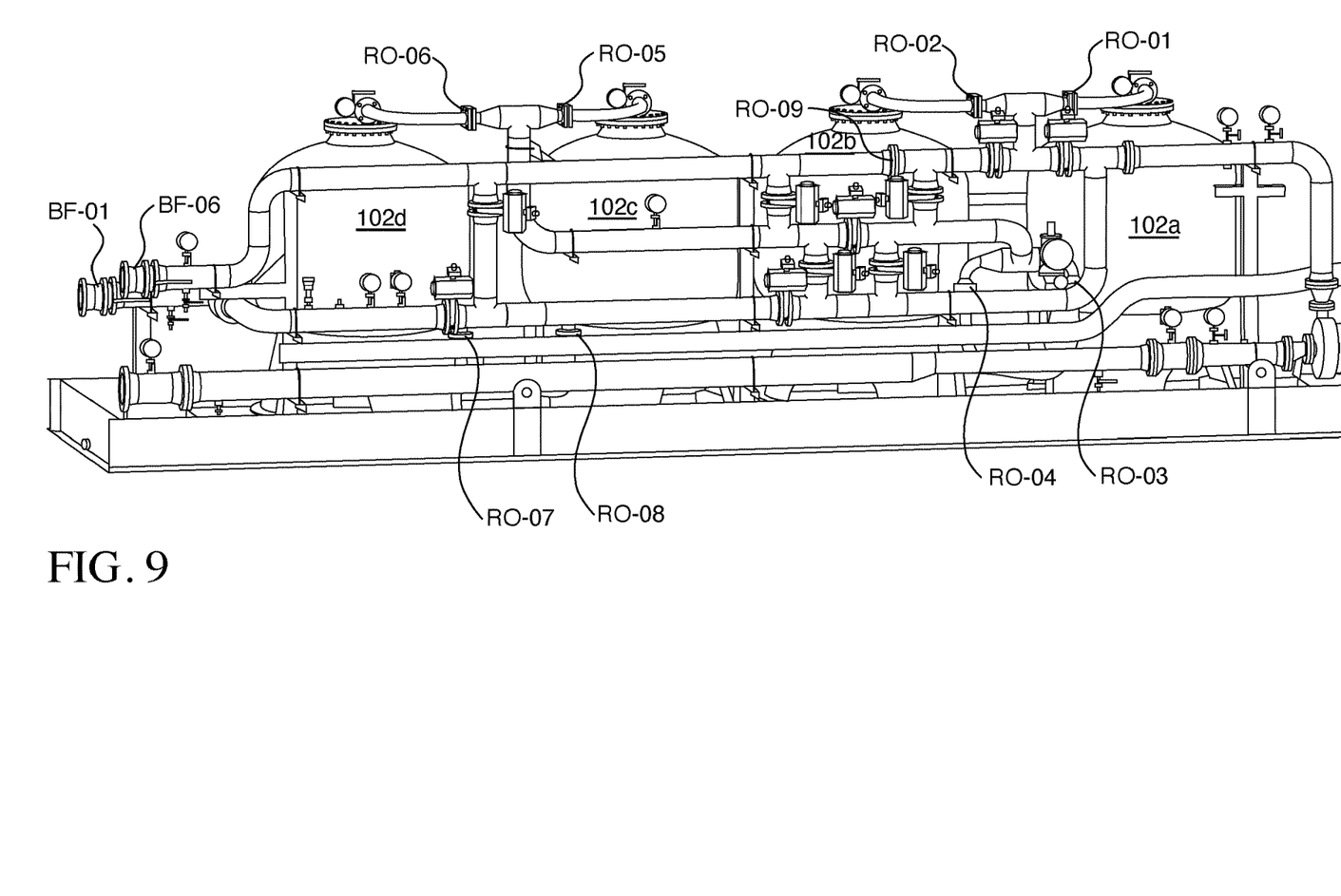
FIG. 9 illustrates a side perspective view of mechanical pressure and flow control devices of the fluid cleaning apparatus of the present invention.

FIG. 9 depicts a side perspective view of mechanical pressure and flow control devices of the fluid cleaning apparatus of the present invention. These components sustain specific backpressure and flow control on the system during all operations. Flow control devices ensure evenly distributed water flow to each tank 102a, 102b, 102c, 102d, allowing uniform capture of solids and preventing premature accumulation of solids in a single tank resulting in a non-functional/non-permeable media. Proper backpressure on the system enables the control of the following functions: preventing media from exiting the tanks from water forces during backwash, uniform distribution of water flow across the tanks and media beds, and steady state system pressure allowing the calculation of differential pressure and subsequent control signals, alarms, and shutdowns.

The BF-xx and RO-xx shown in FIG. 9 ae static devices, the "RO" stands for "Restrictive Orifice". These are engineered devices that have specific size holes in them to maintain a back pressure on the system. These static devices can be changed out quickly to adapt to varying pressure differences on the discharge such as tall tanks, long runs of piping or tall pond embankments.

Additional Considerations

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising." "includes." "including." "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary. "or" refers to an inclusive or and not to an exclusive or. For example, a condition A or B is satisfied by any one of the following: A is true (or present) and B is false (or not present). A is false (or not present) and Bis true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating an interactive message through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A system for reconditioning contaminated water, the system comprising:
a transportable skid;
treatment equipment mounted on the transportable skid, wherein the treatment equipment is configured for treating the contaminated water, and wherein the treatment equipment consists of:
a plurality of filter tanks, each filter tank containing a media mixture comprising media particles to which contaminants adhere when the contaminated water is pumped through the filter tanks; and
an oxidant chemical pump to inject an oxidant into the contaminated water before it is pumped into the filter tanks, the oxidant serving to interact chemically with contaminants in the contaminated water to cause the contaminants to adhere to the media particles in the filter tanks;
water transporting equipment mounted on the transportable skid, wherein the water transporting equipment comprises an input pipe, a filtered water output pipe, and a feed water pump configured to pump the contaminated water through the plurality of filter tanks,
wherein the plurality of filter tanks are configured to form a multistage filter system for filtering the contaminated water at different contaminant particle sizes, and
wherein the feed water pump pumps the contaminated water through the multistage filter system in a continuous manner during a normal filtering mode.

2. The system of claim 1, further comprising automation equipment mounted on the skid, wherein the automation equipment is configured for automating a reconditioning process performed by the system, and wherein the automation equipment comprises an Oxidation Reduction Potential (ORP) sensor sampling water as it exits a final stage of the multistage filter system, a measurement of the ORP sensor providing data to control an amount of oxidant being injected into the contaminated water by the oxidant chemical pump.

3. The system of claim 2, the automation equipment further comprising:
a first pressure sensor sensing pressure as the contaminated water enters into a first stage of the multistage filter system; and
a second pressure sensor sensing pressure as water exits a final stage of the multistage filter system,
wherein a difference of pressure between the second pressure sensor and the first pressure sensor provides an indication of an amount of contaminants adhering to the mixed media particles.

4. The system of claim 3, the automation equipment further comprising a backwash system for a backwash process to flush contaminants adhering to the mixed media particles, the backwash system comprising:
a control unit that issues a control signal to stop the feed water pump from pumping contaminated water into the multistage filter system and to reverse a flow of water in the multistage filter system by pumping recycled water backwards through the multistage filter system to flush out contaminants adhering to the mixed media particles;
a surfactant pump to inject a surfactant into the recycled water used for the backwash process to assist in the flushing of contaminants from the mixed media particles; and
a backwash exit pipe to permit the backwash water with flushed contaminants to be ejected to an external backwash water holding facility,
wherein the backwash process is initiated by the control unit when a pressure difference between the second and first pressure sensors reaches a preset pressure difference.

5. The system of claim 1, further comprising automation equipment mounted on the skid, wherein the automation equipment is configured for automating a reconditioning process performed by the system, and wherein the automation equipment comprises a variable frequency drive (VFD) that controls a speed of the water pump so that the contaminated water being pumped continuously through the multistage filter system is pumped at a constant rate determined by a control signal to the VFD.

6. The system of claim 1, wherein the plurality of filter tanks comprise four filter tanks configured so that the multistage filter system comprises a first stage and a second stage.

7. The system of claim 1, wherein the transportable skid comprises a containment drip pan configured for catching water that spills from the plurality of filter tanks.

8. The system of claim 1, further comprising a respective plurality of tank support structures on the transportable skid, wherein each tank of the plurality of filter tanks is attached to a respective one of the tank support structures.

9. The system of claim 1, wherein the media mixture in the plurality of filter tanks comprises at least two of: silica quartz, anthracite coal, and garnet.

10. The system of claim 9, wherein the multistage filter system comprises a first stage for filtering contaminants having a first contaminant particle size, and a second stage for filtering contaminants having a second contaminant particle size that is smaller than the first contaminant particle size.

11. The system of claim 10, wherein a first media mixture in the first stage comprises anthracite coal and silica quartz, and wherein a second media mixture in the second stage comprises silica quartz, anthracite coal, and garnet.

12. A water treatment system to recondition contaminated water in oil and gas fields, the water treatment system comprising:
a skid configured to be a mounting frame that permits the system to be transportable;
treatment equipment mounted on the skid; and
water transporting equipment mounted on the skid,
wherein the treatment equipment is configured for treating the contaminated water, and wherein the treatment equipment consists of:
four filter tanks configured to be a multi-stage filter system comprising media mixtures serving as filtering particles to which contaminants in the contaminated water will adhere; and
an oxidant chemical pump to inject an oxidant into the contaminated water before it is pumped into the multi-stage system, the oxidant chemically interacting with contaminants in the contaminated water to permit the contaminants to adhere to the filtering particles in the media mixtures in the multi-stage filter system;

wherein the water transporting equipment is configured for transporting the contaminated water, and wherein the water transporting equipment comprises:
- a contaminated water input pipe to be connected to a source of contaminated water to be filtered and reconditioned;
- a unit pump mounted on the skid, the unit pump configured to pump contaminated water received via the contaminated water input pipe through the multistage filter system during a normal filtering mode; and
- a filtered water output pipe through which filtered and decontaminated water exiting from the multistage filter exits the water treatment system,
- wherein, during the normal filtering mode, the unit pump continuously pumps input contaminated water through the multi-stage filter system.

13. The water treatment system of claim 12, further comprising automation equipment mounted on the skid, wherein the automation equipment is configured for automating a reconditioning process performed by the system, and wherein the automation equipment comprises an Oxidation Reduction Potential (ORP) sensor mounted on the filtered water output pipe for sampling water as it exits a final stage of the multistage filter system, a measurement of the ORP sensor providing data to control an amount of oxidant being injected into the contaminated water by the oxidant chemical pump.

14. The water treatment system of claim 13, the automation equipment further comprising:
- a first pressure sensor sensing water pressure as the contaminated water enters into a first stage of the multistage filter system; and
- a second pressure sensor sensing water pressure as water exits a final stage of the multistage filter system,
  - wherein a difference of pressure between the second pressure sensor and the first pressure sensor provides an indication of an amount of contaminants adhering to the mixed media filtering particles.

15. The water treatment system of claim 14, the automation equipment further comprising a backwash system for flushing off contaminants adhering to the mixed media filtering particles, the backwash system comprising:
- a plurality of control valves that sequentially direct a flow of reconditioned water through the multistage filter system in a plurality of backwash stages;
- a surfactant chemical pump that pumps a surfactant into the reconditioned water used for a backwash flushing of the multistage filter, to assist in flushing contaminant particles from the mixed media filtering particles in the multistage filter tanks; and
- a backwash water output pipe through which the reconditioned water used to flush the multistage filters during a backwash procedure is ejected from the water treatment system.

16. The water treatment system of claim 12, wherein laterals located at a bottom of the four filter tanks and used to distribute water upward through the mixed media are comprised of a stainless steel.

17. The wastewater treatment system of claim 12, wherein the skid comprises a containment drip pan configured for catching water that spills from the four filter tanks.

18. The wastewater treatment system of claim 12, further comprising four tank support structures on the skid, wherein each one of the filter tanks is attached to a respective one of the tank support structures.

* * * * *